United States Patent
Chawda et al.

(10) Patent No.: US 11,620,128 B1
(45) Date of Patent: Apr. 4, 2023

(54) MACHINE LEARNING-BASED IDENTIFICATION OF MONOLITHIC SOFTWARE APPLICATION

(71) Applicant: Amazon Technologies, Inc., Seattle, WA (US)

(72) Inventors: Vivek Chawda, Albany, CA (US); Samartha Chandrashekar, Bellevue, WA (US); Sophia Tsang, Newark, CA (US); Frederick Lee von Wurden, Redmond, WA (US); Roland Mesde, Cupertino, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/409,383

(22) Filed: Aug. 23, 2021

(51) Int. Cl.
    *G06F 8/75* (2018.01)
    *G06N 20/00* (2019.01)
    *G06F 8/71* (2018.01)

(52) U.S. Cl.
    CPC .......... *G06F 8/75* (2013.01); *G06F 8/71* (2013.01); *G06N 20/00* (2019.01)

(58) Field of Classification Search
    CPC .............. G06F 8/75; G06F 8/71; G06N 20/00
    USPC ........................................................ 717/120
    See application file for complete search history.

(56) References Cited

U.S. PATENT DOCUMENTS

| 2012/0137240 A1 | 5/2012 | Krueger |
| 2012/0265507 A1 | 10/2012 | Carbajales et al. |
| 2017/0097820 A1 | 4/2017 | Lategan |
| 2019/0253485 A1 | 8/2019 | Jyoti Banerjee |
| 2021/0042141 A1* | 2/2021 | De Marco ........... G06F 9/45558 |

OTHER PUBLICATIONS

Non-Final Office Action, U.S. Appl. No. 17/037,075, dated Sep. 21, 2021, 8 pages.
U.S. Appl. No. 17/409,448, Pending.
U.S. Appl. No. 17/409,426, Pending.
U.S. Appl. No. 17/037,075, Pending.
U.S. Appl. No. 17/109,359, Pending.
(Continued)

*Primary Examiner* — John Q Chavis
(74) *Attorney, Agent, or Firm* — Nicholson De Vos Webster & Elliott LLP

(57) ABSTRACT

Techniques are described for automatically identifying monolithic software applications in users' computing environments for software modernization purposes. A monolithic patent application typically refers to a single-tiered application with self-contained functionality designed largely without modularity, although many types of applications can have monolithic characteristics. In many cases, modularity in a software application's design is desirable and thus developers may often seek to decompose monolithic applications into more modular "microservices" or other subunits when possible. A software modernization system includes a software analysis service that obtains, for one or more software applications undergoing evaluation, a collection of application artifacts, application profiling metrics, and other application profile data. A collection of features is extracted from the application artifacts and metrics and used as input to a ML model trained to determine whether a software application likely is monolithic.

20 Claims, 8 Drawing Sheets

(56) References Cited

OTHER PUBLICATIONS

Notice of Allowance, U.S. Appl. No. 17/109,359, dated Dec. 21, 2021, 9 pages.
Jiangtao Zhang et al., Unpublished U.S. Appl. No. 17/109,359, filed Dec. 2, 2020, entitled "Power Supply Shedding for Power Efficiency Optimization", 45 pages.
Jiangtao Zhang, Unpublished U.S. Appl. No. 17/037,075, filed Sep. 29, 2020, entitled "Optimal Software Architecture Recommendations by an Application Modernization Service", 45 pages.
Chen, R. et al., "From Monolith to Microservices: A Dataflow-Driven Approach," 2017 24th Asia-Pacific Software Engineering Conference (APSEC), 2017, pp. 466-475.
Gulati, V. et al., "Introducing IBM Mono2Micro," IBM Cloud Blog, May 6, 2020, https://web.archive.org/web/20201109163249/https://www.ibm.com/cloud/blog/announcements/ibm-mono2micro, 7 pages.
Patel, C. et al., "Software Clustering Using Dynamic Analysis and Static Dependencies," Thesis M. Comp. Sc. Concordia University, Aug. 2008, 103 pages.
Xiao, C. et al., "Software Clustering Based on Dynamic Dependencies," Ninth European Conference on Software Maintenance and Reengineering, 2005, pp. 124-133.

\* cited by examiner

US 11,620,128 B1

MACHINE LEARNING-BASED IDENTIFICATION OF MONOLITHIC SOFTWARE APPLICATION

BACKGROUND

Modernizing software applications is a common task for business organizations and other entities desiring to improve their information technology (IT) environments in response to changing software application use cases, resource demands, and user access patterns. For example, while many legacy applications were designed for older operating environments with lesser expectations, modern applications now often need the ability to scale quickly to potentially millions of users, have global availability, manage very large amounts of data, and respond to requests in milliseconds. The processes for upgrading, converting, rewriting, etc., such applications to enable improved performance is referred to generally as software modernization. Software application and software-based system modernization can include, for example, porting legacy applications or systems to modern computer programming languages or application frameworks, updating software libraries, protocols, or hardware platforms, and the like. For organizations desiring to make use of cloud provider network resources, the modernization process can further include migrating resources from an organization's on-premises environment to a cloud provider network, modernizing an application's architecture with containers, serverless functions, and other more scalable architecture tools provided by cloud provider networks.

BRIEF DESCRIPTION OF DRAWINGS

Various examples in accordance with the present disclosure will be described with reference to the drawings, in which.

DETAILED DESCRIPTION

Figure 1:
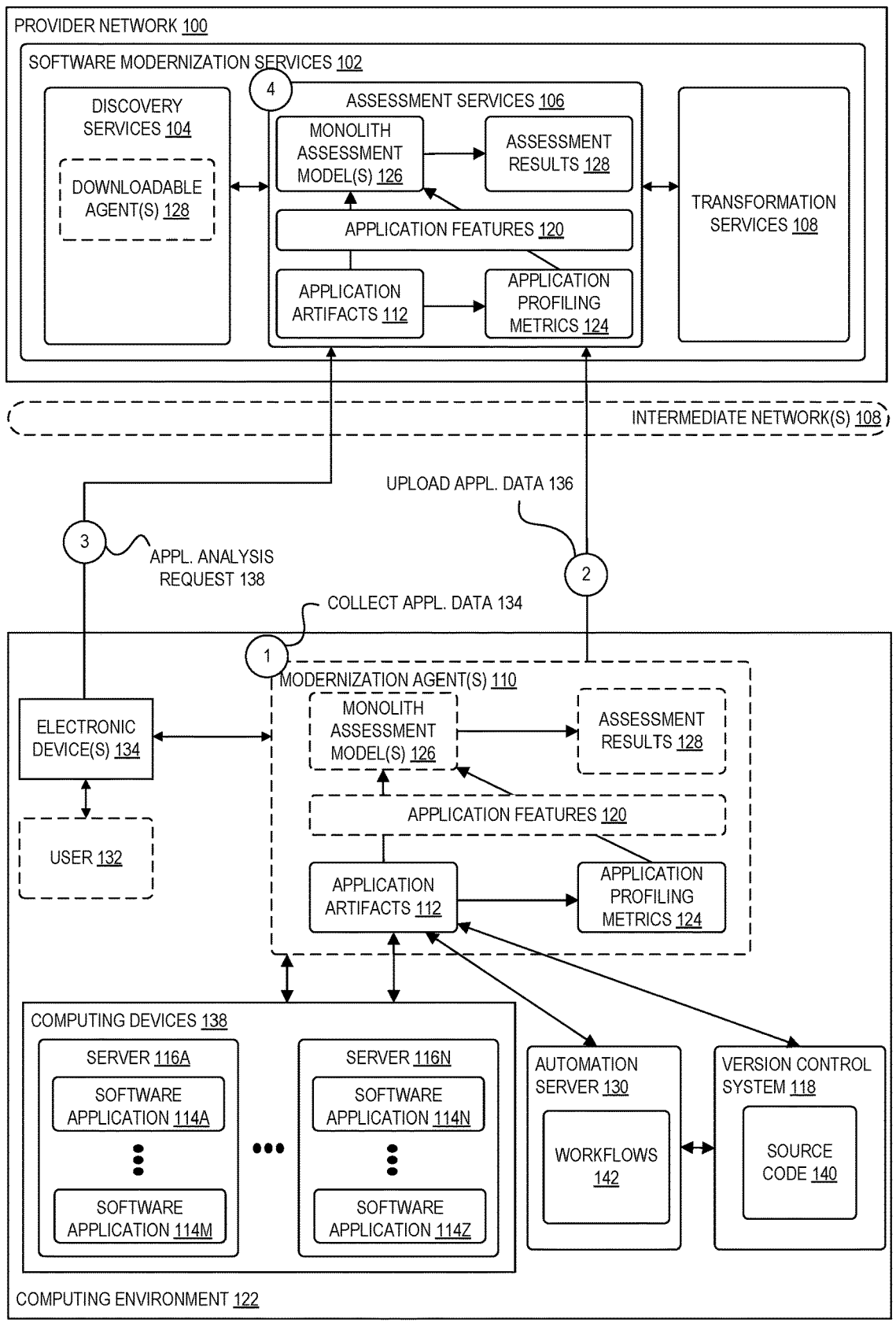
FIG. 1 is a diagram illustrating an environment for using machine learning techniques to identify monolithic software applications according to some examples.

The present disclosure relates to methods, apparatus, systems, and non-transitory computer-readable storage media for automatically identifying monolithic software applications in users' computing environments as part of software modernization efforts or other processes. In this context, a monolithic patent application typically refers to a single-tiered application with self-contained functionality designed largely without modularity, although many types of applications can have monolithic characteristics. In many cases, modularity in a software application's design is desirable and thus developers may often seek to decompose monolithic applications into more modular "microservices" or other independently deployable subunits if possible. According to examples described herein, a software modernization system includes an assessment service that obtains, for one or more software applications undergoing evaluation, a collection of application artifacts (e.g., source code, intermediate files, configuration files), application profiling metrics (e.g., source code analysis metrics, runtime metrics, etc.), and possibly other application profile data. The assessment service further extracts a collection of features from these application artifacts and metrics (e.g., features indicating number of lines of source code associated with an application, version control system repository commit frequency, etc.) and uses the obtained features as input to a machine learning (ML) model trained to predict whether a software application is monolithic. Among other benefits, the described assessment service enables the efficient identification of monolithic applications within users' computing environments, thereby improving software developers' ability to improve the performance, scalability, and technical diversity of such applications.

As indicated, decomposing a monolithic software application into a modernized application architecture and computing environment is a challenging task. However, the benefits of doing so are plenty. For example, modernized software applications tend to reduce the cognitive load on software developers and facilitate technical diversity, improve development team autonomy, and improve resource scalability. The process of decomposing a monolithic application can include several phases such as, for example, analyzing the application for candidate components for refactoring into separate microservices, refactoring a software application's code base into the constituent services, and iterating on the process until the newly implemented services are properly defined by their domain boundaries.

The modernization of monolithic software applications in this manner however typically begins first with the identification of a software application as having monolithic characteristics. While apparent in some cases, many times the identification of such monolithic software applications can be challenging, particularly in computing and software development environments containing many software applications of varying types and complexity. The automated processes for identifying monolithic software applications described in examples herein enable users to readily identify such applications and to expedite modernization processes, thereby further improving the performance, scalability, and development time needed to improve the software applications, among other benefits.

FIG. 1 is a diagram illustrating an environment for using ML-based techniques to identify monolithic software applications according to some examples. A provider network 100 (or, "cloud" provider network) provides users with the ability to use one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources can be provided as services, such as a hardware virtualization service that can execute compute instances, a storage service that can store data objects, etc. The users (or "customers") of provider networks 100 can use one or more user accounts that are associated with a customer account, though these terms can be used somewhat interchangeably depending upon the context of use. Users can interact with a provider network 100 across one or more intermediate networks (e.g., the internet) via one or more interface(s), such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) can be part of, or serve as a front-end to, a control plane of the provider network 100 that includes "backend" services supporting and enabling the services that can be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a geographical area in which the cloud provider clusters data centers. Each region includes multiple (e.g., two or more) availability zones (AZs) connected to one another via a private high-speed network, for example a fiber communication connection. An AZ (also known as an availability domain, or simply a "zone") provides an isolated failure domain including one or more data center facilities with separate power, separate networking, and separate cooling from those in another AZ. A data center refers to a physical building or enclosure that houses and provides power and cooling to servers of the cloud provider network. Preferably, AZs within a region are positioned far enough away from one another so that a natural disaster (or other failure-inducing event) should not affect or take more than one AZ offline at the same time.

Customers can connect to an AZ of the cloud provider network via a publicly accessible network (e.g., the Internet, a cellular communication network), e.g., by way of a transit center (TC). TCs are the primary backbone locations linking customers to the cloud provider network and can be collocated at other network provider facilities (e.g., Internet service providers (ISPs), telecommunications providers) and securely connected (e.g., via a VPN or direct connection) to the AZs. Each region can operate two or more TCs for redundancy. Regions are connected to a global network which includes private networking infrastructure (e.g., fiber connections controlled by the cloud provider) connecting each region to at least one other region. The cloud provider network can deliver content from points of presence (or "POPs") outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

Generally, the traffic and operations of a provider network can broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the provider network (e.g., computing instances, containers, block storage volumes, databases, file storage). Data plane traffic generally includes non-administrative operations, such as transferring customer data to and from the customer resources. The control plane components are typically implemented on a separate set of servers from the data plane servers, and control plane traffic and data plane traffic can be sent over separate/distinct networks.

To provide these and other computing resource services, provider networks 100 often rely upon virtualization techniques. For example, virtualization technologies can provide users the ability to control or use compute resources (e.g., a "compute instance," such as a VM using a guest operating system (O/S) that operates using a hypervisor that might or might not further operate on top of an underlying host O/S, a container that might or might not operate in a VM, a compute instance that can execute on "bare metal" hardware without an underlying hypervisor), where one or multiple compute resources can be implemented using a single electronic device. Thus, a user can directly use a compute resource (e.g., provided by a hardware virtualization service) hosted by the provider network to perform a variety of computing tasks. Additionally, or alternatively, a user can indirectly use a compute resource by submitting code to be executed by the provider network (e.g., via an on-demand code execution service), which in turn uses one or more compute resources to execute the code—typically without the user having any control of or knowledge of the underlying compute instance(s) involved.

In some examples, the provider network 100 includes a hardware virtualization service. A hardware virtualization service (referred to in various implementations as an elastic compute service, a virtual machines service, a computing cloud service, a compute engine, or a cloud compute service) can enable users of the provider network 100 to provision and manage compute resources such as virtual machine instances. Virtual machine technology can use one physical server to run the equivalent of many servers (each of which is called a virtual machine), for example using a hypervisor, which can run at least on an offload card of the server (e.g., a card connected via PCI or PCIe to the physical CPUs) and other components of the virtualization host can be used for some virtualization management components. Such an offload card of the host can include one or more CPUs that are not available to customer instances, but rather are dedicated to instance management tasks such as virtual machine management (e.g., a hypervisor), input/output virtualization to network-attached storage volumes, local migration management tasks, instance health monitoring, and the like). Virtual machines are commonly referred to as compute instances or simply "instances." As used herein, provisioning a virtual compute instance generally includes reserving resources (e.g., computational and memory resources) of an underlying physical compute instance for the client (e.g., from a pool of available physical compute instances and other resources), installing or launching required software (e.g., an operating system), and making the virtual compute instance available to the client for performing tasks specified by the client.

In some examples, a provider network 100 further includes a container service, which can include a container orchestration and management service (referred to in various implementations as a container service, cloud container service, container engine, or container cloud service) that allows users of the cloud provider network to instantiate and manage containers. In some examples, the container service can be a Kubernetes-based container orchestration and management service (referred to in various implementations as a container service for Kubernetes, Azure Kubernetes service, IBM cloud Kubernetes service, Kubernetes engine, or container engine for Kubernetes). A container, as referred to herein, packages up code and all its dependencies so an application (also referred to as a task, pod, or cluster in various container services) can run quickly and reliably from one computing environment to another. A container image is a standalone, executable package of software that includes everything needed to run an application process: code, runtime, system tools, system libraries and settings. Container images become containers at runtime. Containers are thus an abstraction of the application layer (meaning that each container simulates a different software application process). Though each container runs isolated processes, multiple containers can share a common operating system, for example by being launched within the same virtual machine. In contrast, virtual machines are an abstraction of the hardware layer (meaning that each virtual machine simulates a physical machine that can run software). While multiple virtual machines can run on one physical machine, each virtual machine typically has its own copy of an operating system, as well as the applications and their related files, libraries, and dependencies. Some containers can be run on instances that are running a container agent, and some containers can be run on bare-metal servers, or on an offload card of a server.

In some examples, the provider network 100 further includes an on-demand code execution service. An on-demand code execution service (referred to in various implementations as a function compute service, functions service, cloud functions service, functions as a service, or serverless computing service) can enable customers of the provider network 100 to execute their code on cloud resources without having to select or manage the underlying hardware resources used to execute the code. For example, a customer can use the on-demand code execution service by uploading their code and use one or more APIs to request that the service identify, provision, and manage any resources required to run the code.

In some examples, a software modernization service 102 provides various types of software modernization services and functionality, including discovery services 104, assessment services 106, and transformation services 108, which are collectively aimed at helping users to discover and use recommended modernization and migration paths for their software applications. The discovery services 104, for example, provide various services, software applications, software agents, and other tools (e.g., including downloadable modernization agents 110) used to identify software applications in users' computing environments and to collect artifact and profiling information for software applications undergoing modernization processes. The assessment services 106 enable users and applications to obtain various types of software modernization assessments and recommendations, e.g., based on analyses of application artifacts (e.g., source code and bytecode) and application profiling metrics collected for users' applications by the discovery services 104 and associated tools. For example, the recommendations generated by an assessment service 106 can include recommended modernization strategies, recommended modernization tools, estimated modernization costs, etc. In some examples, transformation services 108 include various services, applications, and other tools used to perform modernization actions and migrations, possibly based, for example, on modernization recommendations generated by assessment services 106.

According to examples described herein, a software modernization system can be used to identify software applications within users' computing environment that likely are implemented using a monolithic design pattern, and to optionally generate proposed decomposition and modernization strategies for such identified monolithic software applications. In some examples, a modernization agent 110 includes or interfaces with one or more application analyzers configured to statically and dynamically analyze application artifacts (e.g., application artifacts 112 including source code, bytecode, or other associated artifacts) obtained for software applications undergoing analysis (e.g., any of software applications 114A, . . . , 114M, 114N, . . . , 114Z running on servers 116A, . . . , 116N) and to optionally obtain other application analysis feeds. In some examples, some or all the source code files, bytecode files, and other application artifacts for a software application under analysis can be obtained from a version control system 118, automation server 130, or other storage locations within or external to a user's computing environment 122.

In some examples, application analyzers that are part of or separate from the modernization agent(s) 110 generate application profiling metrics 124 related to application components and dependency relationships among application components (e.g., packages, files, classes, methods, variables, etc.), including static and runtime analysis information, version control system commit information, and the like. In some examples, the application artifacts 112 and application profiling metrics 124 can be represented and stored as a graph model and used as input to one or more clustering algorithms to identify application component clusters. In some examples, the application artifacts 112 and application profiling metrics 124 can be used by an assessment service 106 to obtain a collection of application features 120 for a software application, where such features can be used as input to a monolith assessment model 126 trained to predict whether a given software application represents a monolith or not (or to predict a relative degree of the application's monolithic characteristics). As shown in FIG. 1, the monolith assessment process optionally can be performed locally in a user's computing environment 122, as a remotely-accessible service provided by a cloud provider network 100, or within other computing environments or combinations thereof.

In FIG. 1, the circles labeled (1)-(4) illustrate an example process in which a user optionally obtains a modernization agent 110 used to inventory and analyze software applications in the user's computing environment including, for example, processes related to identifying monolithic software applications. In some examples, the identification of monolithic software applications can help users prioritize efforts to modernize applications in their computing environments, e.g., including decomposing monolithic application into smaller microservices or services. Each decomposed service, for example, may represent a defined subset of a software application's functionality that, with some amount of refactoring, can be implemented as an independently developed, buildable, and deployable service. For example, in a microservices architecture, an application is implemented as a collection of smaller services ("microservices") that can be deployed and scaled independently from one another and which can communicate with one another over a network. These microservices are typically fine-grained, in that they have specific technical and functional granularity, and often implement lightweight communications protocols. The microservices of an application can perform different functions from one another, can be independently deployable, and may use different programming languages, databases, and hardware/software environment from one another. As indicated herein, decomposing an application into smaller services beneficially improves modularity of the application, enables replacement of individual microservices as needed, and parallelizes development by enabling teams to develop, deploy, and maintain their microservices independently from one another. A microservice may be deployed using a virtual machine, container, or serverless function, in various examples.

In some examples, in FIG. 1, a user accesses the software modernization service 102 (for example, via various interfaces provided by discovery services 104) to obtain information about available modernization services and tools and to obtain one or more downloadable agents 110. The user can download one or more modernization agents 110 and install the agents on servers within the user's on-premises computing environment 122 (e.g., on physical servers or VMs). In some examples, users (e.g., a user 132) can use a computing device 134 to interact with the modernization agent 110 via a command line interface (CLI), graphical user interface (GUI), or any other type of interface provided by the modernization agent 110. For example, in FIG. 1, a user 132 has obtained and installed the modernization agent 110, possibly including one or more application analyzers, on a computing device within the user's computing environment 122 (e.g., at an on-premises datacenter or other type of user computing environment) to assist with modernizing one or more software applications 114A, . . . , 114Z running or under development in the user's computing environment 122. The software applications 114A, . . . , 114Z, for example, may include one or more applications deployed or under development on one or more Linux®-based or Windows®-based hosts and generally represent any type of software that may be executing in a computing environment (e.g., software implementing a web application or service, business application software, etc.). Each of the software applications can be a single process or a group of interoperating processes and may execute within a virtualized or non-virtualized execution environment (e.g., the Java® virtual machine (JVM) in the case of a Java application, or any other execution environment for other types of applications).

As part of a modernization assessment process, in some examples, a user invokes at circle (1) an inventory and application data collection command used to identify applications within the user's computing environment 122 that can be assessed (e.g., including some or all of software applications 114A, . . . , 114Z in the example of FIG. 1) and to collect 134 application profile data (e.g., including application artifacts 112 and metrics 124). In some examples, instead of interacting directly with the modernization agent 110, the user 132 instead interacts with a web-based console or other interface provided by the software modernization service 102. The software modernization service 102 may then in turn instruct a modernization agent 110 or other application running in the user computing environment 122 to perform some or all of the application inventory and profiling metrics collection operations described in reference to FIG. 1 such as, for example, identifying an inventory of applications, obtaining application artifacts 112 for the applications (e.g., including source code or binary executable file information identifying JAR files, DLL files, process identifiers, etc.), among other possible types of application profile information described herein.

In some examples, a modernization agent 110 or other application collects dynamic runtime information about discovered software applications including, e.g., process identifiers, runtime artifacts such as binary executables, JAR files, DLL files, etc. A modernization agent 110 can further collect source code 140, for example, stored in a version control system 118 or other storage location within the user's computing environment 122 or elsewhere. In some examples, a user provides a modernization agent 110, software modernization service 102, or both, with authentication information (e.g., a username and password, security token, etc.) that can be used to access the version control system based on a URL or other access identifier.

In some examples, a user 132 optionally further configures the modernization agent 110 with the ability to access an automation server 130 in the user's computing environment, the provider network 100, or elsewhere, e.g., to collect bytecode files or other types of application artifacts. In some examples, the automation server 130 broadly represents any type of server, service, application, or other tool that helps automate various software development processes such as, for example, building, testing, and deploying software applications. An automation server 130, for example, may automate such processes to facilitate a continuous integration and continuous delivery approach to software development and deployment. In some examples, the automation server 130 is a server-based system that interfaces with version control tools (e.g., a version control system 118) to identify changes to a repository (e.g., code commits) or other events and may further include configurations used to automate one or more actions responsive to the detection of such events. In some examples, users can use an automation server 130 to configure any number of workflows 142 (sometimes also referred to as "jobs," "pipelines," or "projects"), each representing a defined configuration of automated processes for building, testing, and/or deploying software applications. In this example, each workflow may be associated with a configuration file or other data that defines various actions, parameters (e.g., locations of source repositories, names of binary executable files to be generated, locations at which to store binary executable files, etc.). In some examples, an automation server 130 provides an interface (e.g., a network-accessible API) via which users and applications can request server-related information and perform various actions including, e.g., obtaining a list of configured workflows, obtaining configuration information associated with configured workflows, creating new workflows, obtaining data indicating a number of times each workflow has been run and when the workflow was executed, etc.

In some examples, the modernization agent uploads 136 application artifacts and application profiling metrics, including identifiers of the discovered software applications in the user's computing environment 122. The assessment service 106 can use the uploaded application artifacts and profiling data, for example, to create a software application list that associates the identified software applications with a user account used by the user 132. The software application list, for example, may be displayed to a user in a GUI or other interface to provide a user with information about the discovered set of applications in the user's computing environment 122. In other examples, the application profile data is stored only locally by the modernization agent 110.

As indicated, in some examples, either an assessment service 106 or modernization agent 110 further initiates processes to analyze a software application identified by the modernization agent 110 to obtain application profiling metrics 124 and, optionally, to generate a graph-based representation of the software application, e.g., as part of a process aimed at analyzing and decomposing one or more monolithic software applications. In some examples, the software modernization service 102 or modernization agent 110 receives a request 138 to view a decomposition analysis of a software application including, e.g., an identification of software component clusters, a graph-based visualization of the application, migration options, and the like. In some examples, responsive to such requests, an assessment service 106 generates or otherwise obtains application artifacts 112, application profiling metrics 124, a corresponding graph model, or combinations thereof. In some examples, this data can be used to obtain a set of application features 120 to be used as input to a monolith assessment model 126 trained to identify monolithic software applications. These features can include data indicating, for example, a number of lines of source code implementing a software application, a number of classes in the source code for an application, a number of edges in a graph model of the application (e.g., representing various types of application component dependencies), an amount of development activity associated with the application (e.g., as measured based on version control system logs or other sources), a number of testing units available for the application (e.g., unit tests), organization structure data indicating a number of separate development teams working on an application, an amount of traffic served by the application, a number of independent islands based on weakly connected components of a graph model, a number of legacy package dependencies, an amount of time taken between major application updates (e.g., as measured based on version control system logs, automation server logs, etc.), resource usage information, a number of connected projects, a metric reflecting an amount of coupling or cohesion of the software application (e.g., where monolithic applications tend to exhibit high coupling and low cohesion metrics as measured by a source code analysis or other analysis tool), and the like. In some examples, one or more of the obtained features can be associated with a relative weighting that is applied to the feature before it is provided as input to a model, e.g., to reflect a perceived relative importance of certain features in the monolith identification task. In some examples, the weighting of one or more features can be provided as input by a user requesting the analysis of an application, e.g., to reflect a perceived importance of certain features to a user's particular use case.

Figure 2:
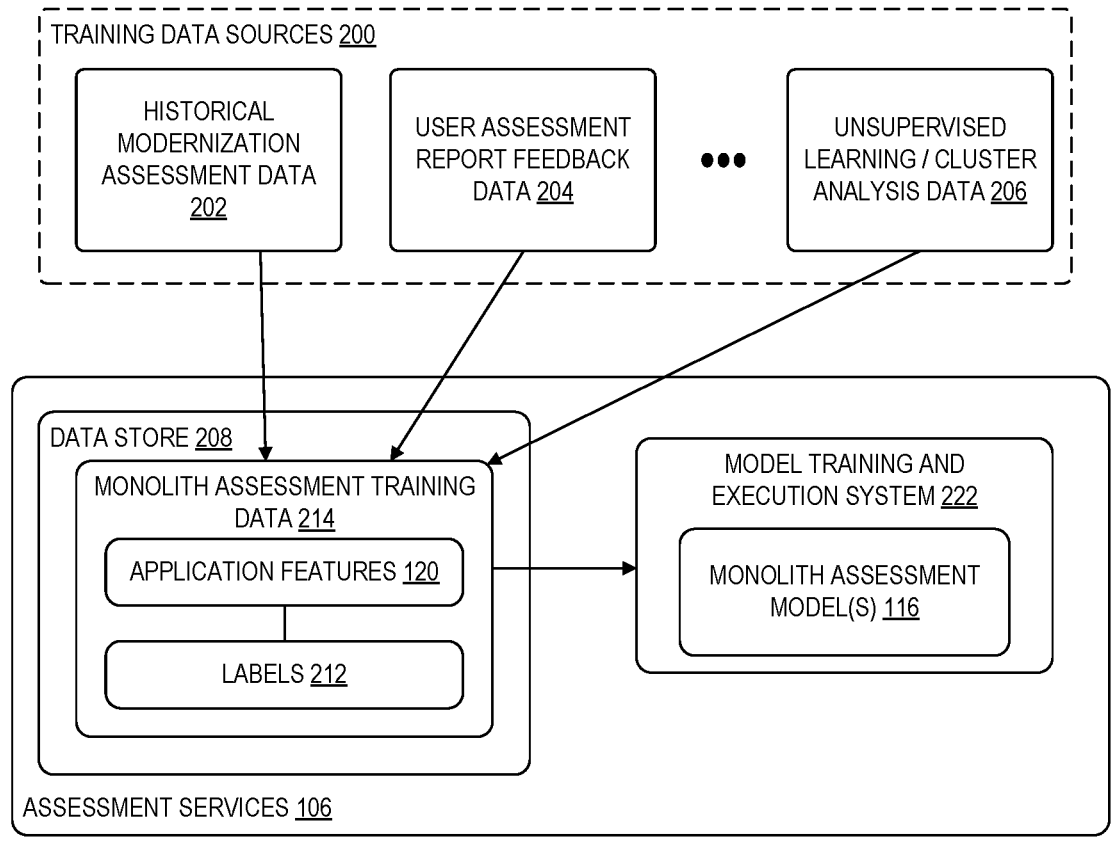
FIG. 2 is a diagram illustrating processes related to collecting data used to train a monolith assessment model according to some examples.

FIG. 2 is a diagram illustrating types of training data that can be collected and used to train ML-based monolith assessment models according to some examples. As shown in FIG. 2, in some examples, the monolith detection training data 214 can be derived from data sources 200 including historical modernization assessment data 202, user assessment report feedback data 204 (e.g., data obtained from logging user feedback to application modernization assessment reports indicating whether particular applications are monolithic or not), unsupervised learning/cluster analysis data 206, among other possible sources. In some examples, the assessment services 106 stores the monolith detection training data 214 in one or more data stores 208 accessible to the model training and execution system 222.

In some examples, the historical modernization assessment data 202 includes any data derived from past modernization assessment analyses performed by the application modernization service 102 or other services and tools. For example, the historical modernization assessment data 202 may include application artifacts and profiling metrics, e.g., based on the use of static source code analyzers or other tools, identified by previous assessment processes for software applications identified as being monolithic. The training data may also include user assessment report feedback data 204, where such information may be logged based on user responses to generated modernization assessment reports, e.g., confirming or rejecting previous identifications of software applications as monoliths. In some examples, the user assessment report feedback data 204 may be collected on an on-going basis and used, e.g., to further train and refine the monolith assessment model(s) 116 as additional assessment reports are generated.

In some examples, the training data sources 200 further includes unsupervised learning/cluster analysis data 206. For example, unsupervised learning techniques may be used to cluster similar software applications based on feature data collected for the applications. Once clustered, labels identifying at least one of the clusters as a monolith or not a monolith can be obtained. For example, a cluster of monolithic applications may be manually identified or previously identified based on other processes. The monolith label can then be extended to other applications in the same cluster and added to the training data 214.

In some examples, as shown in FIG. 2, the assessment service 106 collects the training data 214 and stores the data in a data store 208. The data may be collected in a number of ways including, for example, users uploading, importing, or otherwise storing the data in association with the service 102, the service 102 obtaining or ingesting the data from various software agents, applications, or services internal or external the provider network 100, or users generating the monolith assessment training data 214 using the application modernization service 102. In some examples, the data collection process can occur over any period of time and the collected data can be continually updated as new data becomes available to the service 102 (e.g., based on receiving data streamed to the service over time).

In some examples, the resulting training data 214 includes application features 120 and corresponding labels 212 (e.g., labels identifying whether each corresponding application is a monolith or not, identifying a type or degree of monolithic application, or other similar label). In some examples, a model training and execution system 222 or other component of the service 102 optionally performs various data pre-processing operations on the training data 214. In some examples, these pre-processing operations can include organizing the data in various ways, cleaning or transforming the data, deduplicating data entries, or any other operations to aid in the model training processes. In some examples, the optionally preprocessed data is stored in a data store 208. In some examples, the modernization training data store can be any type of data storage managed either by the application modernization service 102 or by another service or application accessible to the application modernization service (e.g., by an object storage service of the provider network 100).

Figure 3:
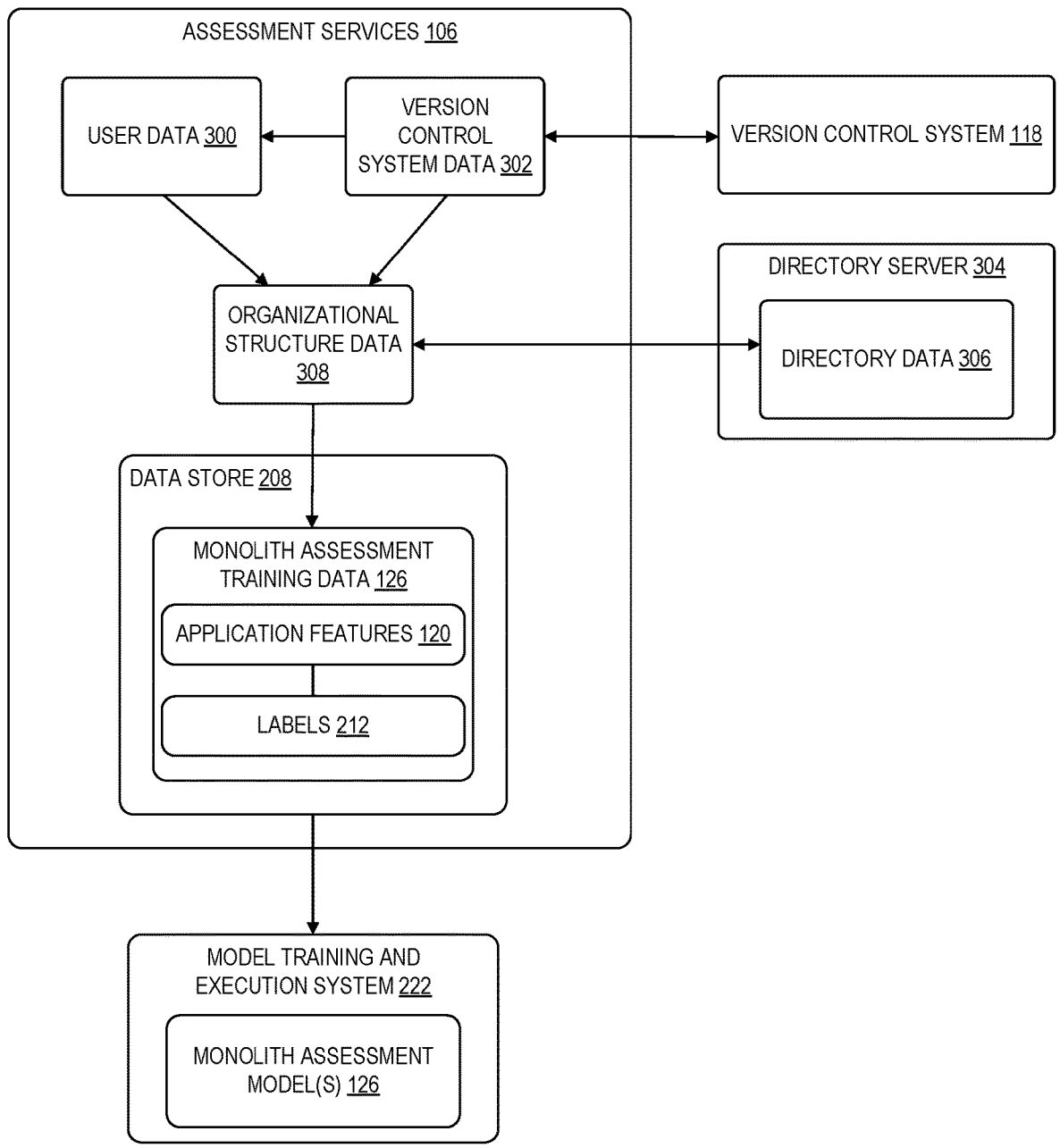
FIG. 3 is a diagram illustrating processes related to obtaining organizational data used as input to a monolith assessment model for training or inference according to some examples.

FIG. 3 illustrates the collection of organizational structure data as an example of one application feature that can be used as input to a monolith assessment model according to some examples. As shown, user data 300 and version control system data 302 can be collected from a version control system 118 by assessment services 106. This data can include, for example, user identifiers (e.g., usernames, email addresses, etc.) associated with commits or other operations involving the source code of one or more software applications.

In some examples, the collected user data 300 and version control system data 302 can be used to query a directory server 304 or other source of directory data 306 indicating the organization of users into one or more separate groups (e.g., separate development teams, separate departments, etc.). For example, if N users are identified as working on a software application based on the version control system data 202, and if those N users are grouped into M different development teams or other groups based on directory data 206 (e.g., based on a graph-based directory structure of the users separating the users into respective development teams, departments, etc.), that information may be indicative of a monolithic application (e.g., where the greater number of separate teams working on a same application may evidence that the application can be decomposed into separate services). As shown, this organizational structure data 208 thus can be included as part of the monolith assessment training data 214.

A ML model (e.g., a monolith assessment model 126), generally, may be thought of as one or more equations that are "trained" using a set of training data. In some examples, the input to the model during training is a set of application features, as described above, and one or more corresponding labels corresponding to an identification of the software application as a monolithic application or not, or of a type of monolithic application (e.g., a heavily monolithic application, a medium monolithic application, etc.). In some examples, the trained ML model thus can include any of: a single-class classifier, a multi-class classifier, a regression-based model (e.g., based on support vector regression, regression trees, random forests, etc.).

In some examples, users can interact with a model training and execution system 222 via a frontend of the model training and execution system 222. For example, a user device can provide a training request that includes a container image (or multiple container images, or an identifier of one or multiple locations where container images are stored), an indicator of input data (for example, an address or location of input data), one or more hyperparameter values (for example, values indicating how the algorithm will operate, how many algorithms to run in parallel, how many clusters into which to separate data, and so forth), and/or information describing the computing machine on which to train a machine learning model (for example, a graphical processing unit (GPU) instance type, a central processing unit (CPU) instance type, an amount of memory to allocate, a type of virtual machine instance to use for training, and so forth).

In some examples, a container image can include one or more layers, where each layer represents an executable instruction. Some or all of the executable instructions together represent an algorithm that defines a ML model. The executable instructions (for example, the algorithm) can be written in any programming language (for example, Python, Ruby, C++, Java, etc.). In some examples, the algorithm is pre-generated and obtained by a user, via the user device, from an algorithm repository. In some examples, the algorithm is completely user-generated or partially user-generated (for example, user-provided code modifies or configures existing algorithmic code).

In some examples, instead of providing a container image (or identifier thereof), the user device may provide an algorithm written in any programming language. The model training and execution system 222 may then package the algorithm into a container (optionally with other code, such as a "base" ML algorithm supplemented with user-provided code) that is eventually loaded into a virtual machine instance for training a machine learning model. In some examples, the model training and execution system 222 can handle the acquisition and configuration of compute capacity (for example, containers, instances, etc., which are described in greater detail below) based on the information describing the computing machine on which to train a ML model provided by the user device. The model training and execution system 222 can then train ML models using the compute capacity.

To perform the ML model training, in some examples, computing resources execute instructions according to hyperparameter values included in the training request. As an illustrative example, a model training and execution system 222 trains a ML model by identifying values for certain parameters (for example, coefficients, weights, centroids, etc.). The identified values depend on hyperparameters that define how the training is performed. Thus, the computing resources can execute the executable instructions to initiate a ML model training process, where the training process is run using the hyperparameter values included in the training request. Execution can include applying the obtained training data as input parameters to some or all of the instructions being executed.

In some examples, the model training processes generate model data. The model data may be stored, for example, in one or more data files in a model data store and can include characteristics of the ML model being trained, such as a number of layers in the machine learning model, hyperparameters of the machine learning model, coefficients of the machine learning model, weights of the machine learning model, and/or the like. In particular, the generated model data includes values for the characteristics that define the ML model being trained.

In some examples, the model training and execution system 222 further includes a model execution system (which may be part of or separate from the model training system), including a single physical computing device or multiple physical computing devices that are interconnected using one or more computing networks (not shown), where the physical computing device(s) host one or more virtual machine instances. The model training and execution system 222 can handle the acquisition and configuration of compute capacity (for example, containers, instances, etc.) based on requests to execute trained ML models. The model training and execution system 222 can then execute ML models using the compute capacity.

In some examples, a request to execute a ML model is transmitted to the model training and execution system 222, where the request includes an input to a ML model (for example, a set of input data). The model training and execution system 222 or another system executes the code in response to receiving the execution request. In particular, execution of the code causes the executable instructions in the code corresponding to the algorithm to read the model data file (e.g., model data obtained from a model data store), use the input included in the execution request as an input parameter, and generate a corresponding output. As an illustrative example, the algorithm can include coefficients, weights, layers, cluster centroids, and/or the like. The executable instructions in the code corresponding to the algorithm can read the model data file to determine values for the coefficients, weights, layers, cluster centroids, and/or the like. The executable instructions can include input parameters, and the input included in the execution request can be supplied as the input parameters. With the ML model characteristics and the input parameters provided, execution of the executable instructions can be completed resulting in an output. In some examples, the output is stored in a data store. Alternatively or in addition, the model training and execution system 222 transmits the output to a user device that submitted the execution request. In some examples, the operating environment supports many different types of machine learning models, such as classification models, multi arm bandit models, reinforcement learning models, ensemble machine learning models, deep learning models, and/or the like.

Returning to FIG. 1, at circle (3), a user generates an application analysis request 138 using a web-based console or other interface. For example, a user can generate a request to analyze a single software application or to analyze a collection of software applications inventoried within their computing environment 122. At circle (4), responsive to such a request, the assessment service 106 uses the application features 120 derived from application artifacts 112 and application profiling metrics 124 to prediction whether the one or more software applications are monolithic applications. As indicated above, the features 120 obtained by the assessment service 106 can include any of: a number of lines of code, a number of classes, a number of identified dependencies between application components of the software application, an amount of version control system activity, an amount of testing units for the software application, an amount of traffic served by the software application, a number of weakly-connected islands identified based on a graph-based analysis of the software application, a number of legacy package dependencies, or resource usage data. These features 120 can be obtained automatically using one or more analyzers (static source code analyzers, build artifact analyzers, call graph profilers, etc.) to analyze the obtained application artifacts for the application(s).

Figure 4:
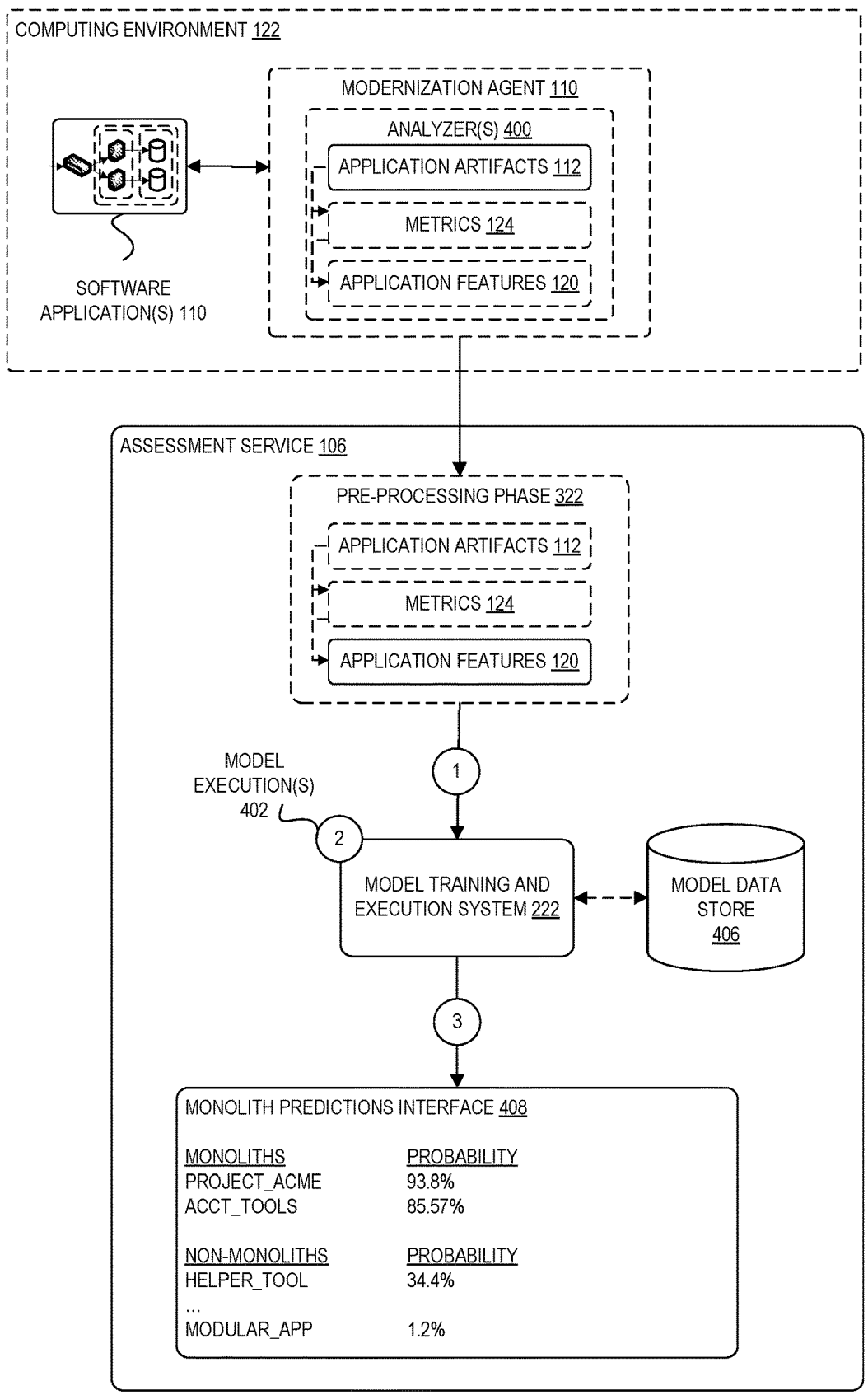
FIG. 4 is a diagram illustrating the use of a trained monolith assessment model as part of generating a software modernization assessment report according to some examples.

FIG. 4 is a diagram illustrating the use of a trained monolith assessment model 126 to obtain monolith predictions for users' software applications and systems according to some examples. As shown, an agent 110, analyzers 400, or assessment service 106 performs one or more optional pre-processing steps to obtain the application artifacts 112, generate metrics 124, and application features 120. At circle (1) in FIG. 4, the features 120 associated with the one or more software application(s) 114 are provided to the model training and execution system 222. In some examples, at circle (2), a model execution system 222 executes one or more of the trained monolith assessment models based on the input. In some examples, the collection of features is then used to identify a label or probability that the software application is monolithic.

For example, in some examples, at circle (3), the model training and execution system 222 executes a monolithic assessment model 116 to generate result(s) indicating whether each analyzed application is a monolith or a probability that each application is a monolith. As shown, the result information can be displayed as part of a monolith predictions interface 408. In this example, the interface 408 displays a collection of application in two groups according to an indication of whether the application is predicted to be a monolith and further including an indication of a confidence score or other measurement of a likelihood that the application is a monolith as obtained from the model. In some examples, the applications can be displayed in a ranked fashion based on the respective confidence scores indicating a likelihood that each application is a monolith, such that a developer can prioritize modernization efforts on the applications.

In other examples, additional information can be displayed such as, for example, an indication of a proposed decomposition of an identified monolithic application (e.g., based on the application of a clustering algorithm to a graph-based representation of the software application). The information can further include proposed migration plans for the monolithic application including, e.g., an identification of computing resources that can be used to implement a decomposed version of the software application in a cloud-based environment. In some examples, the automatic decomposition analysis of applications can be applied only to software applications predicted to be monolithic, thereby avoiding the use of computing resources to analyze applications unlikely to be monolithic.

Figure 5:
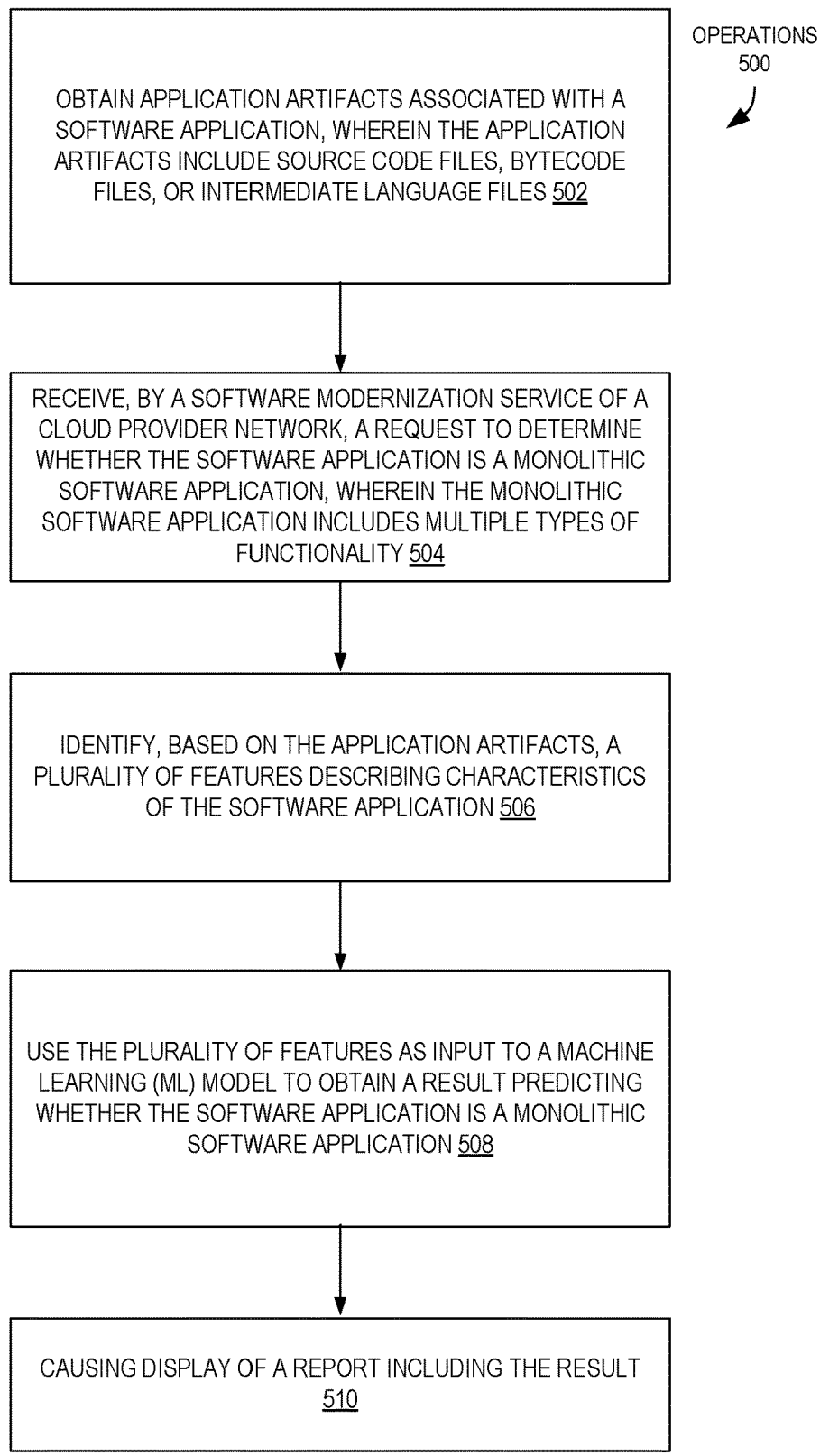
FIG. 5 is a flow diagram illustrating operations of a method for using machine learning techniques to identify monolithic software applications according to some examples.

FIG. 5 is a flow diagram illustrating operations 500 of a method for using machine learning techniques to identify monolithic software applications according to some examples. Some or all of the operations 500 (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, one or more (or all) of the operations 500 are performed by an assessment service 106 of the other figures.

The operations 500 include, at block 502, obtaining application artifacts associated with a software application, wherein the application artifacts include source code files, bytecode files, or intermediate language files.

The operations 500 further include, at block 504, receiving, by a software modernization service of a cloud provider network, a request to determine whether the software application is a monolithic software application, wherein a monolithic software application includes multiple types of functionality.

The operations 500 further include, at block 506, identifying, based on the application artifacts, a plurality of features describing characteristics of the software application.

The operations 500 further include, at block 508, using the plurality of features as input to a machine learning (ML) model to obtain a result predicting whether the software application is a monolithic software application.

The operations 500 further include, at block 510, causing display of a report including the result.

In some embodiments, the operations further include obtaining, from a version control system, data reflecting changes to source code associated with the software application, wherein the data includes identifiers of users associated with the changes to the source code; querying a data source indicating an organizational structure associated with the users to identify a plurality of organizational units into which the users are grouped; and wherein a feature of the plurality of features is derived from the identification of the plurality of organization units.

In some embodiments, the operations further include obtaining an inventory of software applications associated with a user's computing environment, wherein the software applications include the software application; obtaining a plurality of respective feature sets corresponding to the software applications; using each of the plurality of respective feature sets as input to the ML model to obtain a plurality of results predicting whether each of the software applications is a monolithic software application; and causing display of a report including the plurality of results.

In some embodiments, obtaining an inventory of software applications associated with a user's computing environment, wherein the software applications include the software application; obtaining a plurality of respective feature sets corresponding to the software applications; using each of the plurality of respective feature sets as input to the ML model to obtain a plurality of results predicting whether each of the software applications is a monolithic software application, wherein each result of the plurality of results is associated with a respective confidence score; and causing display of a report including the plurality of results ranked by the respective confidence scores.

In some embodiments, the operations further include obtaining data from an automation server reflecting a number of updates to the software application over a period of time, and wherein at least one feature of the plurality of features is derived from the number of updates to the software application.

In some embodiments, the operations further include identifying a category to which the software application belongs; and selecting the ML model from a plurality of ML models based on the category.

In some embodiments, the plurality of features include at least one of: a number of lines of code, a number of classes, a number of identified dependencies between application components of the software application, an amount of version control system activity, an amount of testing units for the software application, an amount of traffic served by the software application, a number of weakly-connected islands identified based on a graph-based analysis of the software application, a number of legacy package dependencies, or resource usage data.

In some embodiments, the ML model is a multi-class classifier, and wherein the result indicates a type of monolithic application from a plurality of types of monolithic applications.

In some embodiments, the operations further include applying a weight to at least one feature of the plurality of features to obtain a weighted feature, and wherein the weighted feature is used as input to the ML model to obtain the result.

In some embodiments, the operations further include causing display of a report including the result indicating whether the software application is a monolithic software application and further including at least one of: a decomposition plan indicating a proposed decomposition of the software application, or a plan for migrating the software application to a cloud-based computing environment.

In some embodiments, the operations further include receiving input from a user confirming or rejecting the result predicting whether the software application is a monolithic software application; and using the input to further train the ML model.

Figure 6:
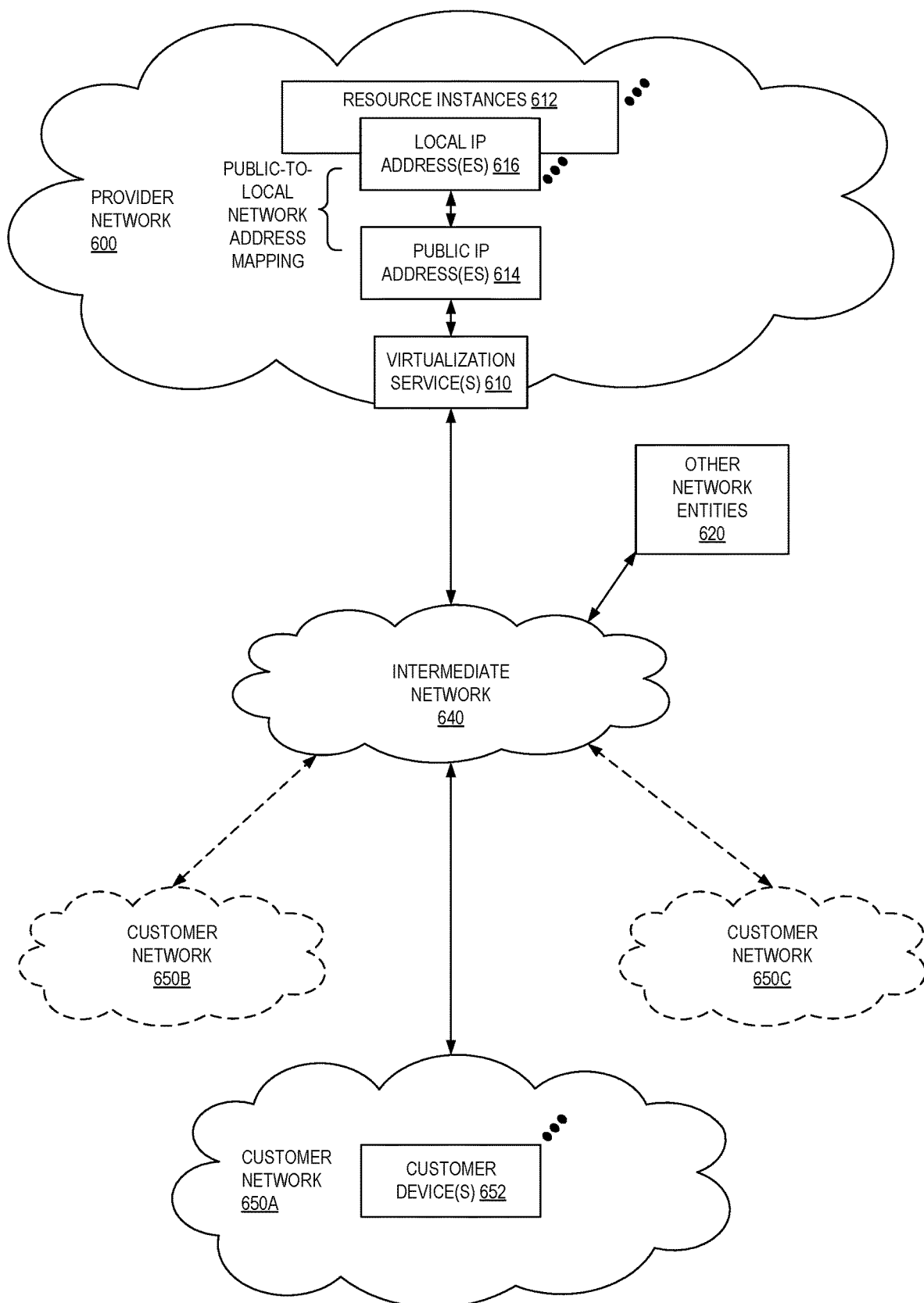
FIG. 6 illustrates an example provider network environment according to some examples.

FIG. 6 illustrates an example provider network (or "service provider system") environment according to some examples. A provider network 600 can provide resource virtualization to customers via one or more virtualization services 610 that allow customers to purchase, rent, or otherwise obtain instances 612 of virtualized resources, including but not limited to computation and storage resources, implemented on devices within the provider network or networks in one or more data centers. Local Internet Protocol (IP) addresses 616 can be associated with the resource instances 612; the local IP addresses are the internal network addresses of the resource instances 612 on the provider network 600. In some examples, the provider network 600 can also provide public IP addresses 614 and/or public IP address ranges (e.g., Internet Protocol version 4 (IPv4) or Internet Protocol version 6 (IPv6) addresses) that customers can obtain from the provider 600.

Conventionally, the provider network 600, via the virtualization services 610, can allow a customer of the service provider (e.g., a customer that operates one or more customer networks 650A-650C (or "client networks") including one or more customer device(s) 652) to dynamically associate at least some public IP addresses 614 assigned or allocated to the customer with particular resource instances 612 assigned to the customer. The provider network 600 can also allow the customer to remap a public IP address 614, previously mapped to one virtualized computing resource instance 612 allocated to the customer, to another virtualized computing resource instance 612 that is also allocated to the customer. Using the virtualized computing resource instances 612 and public IP addresses 614 provided by the service provider, a customer of the service provider such as the operator of the customer network(s) 650A-650C can, for example, implement customer-specific applications and present the customer's applications on an intermediate network 640, such as the Internet. Other network entities 620 on the intermediate network 640 can then generate traffic to a destination public IP address 614 published by the customer network(s) 650A-650C; the traffic is routed to the service provider data center, and at the data center is routed, via a network substrate, to the local IP address 616 of the virtualized computing resource instance 612 currently mapped to the destination public IP address 614. Similarly, response traffic from the virtualized computing resource instance 612 can be routed via the network substrate back onto the intermediate network 640 to the source entity 620.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and can be mutable within the provider network. Network traffic originating outside the provider network is not directly routed to local IP addresses; instead, the traffic uses public IP addresses that are mapped to the local IP addresses of the resource instances. The provider network can include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses can be assigned by the provider network infrastructure to particular resource instances; these public IP addresses can be referred to as standard public IP addresses, or simply standard IP addresses. In some examples, the mapping of a standard IP address to a local IP address of a resource instance is the default launch configuration for all resource instance types.

At least some public IP addresses can be allocated to or obtained by customers of the provider network 600; a customer can then assign their allocated public IP addresses to particular resource instances allocated to the customer. These public IP addresses can be referred to as customer public IP addresses, or simply customer IP addresses. Instead of being assigned by the provider network 600 to resource instances as in the case of standard IP addresses, customer IP addresses can be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 7:
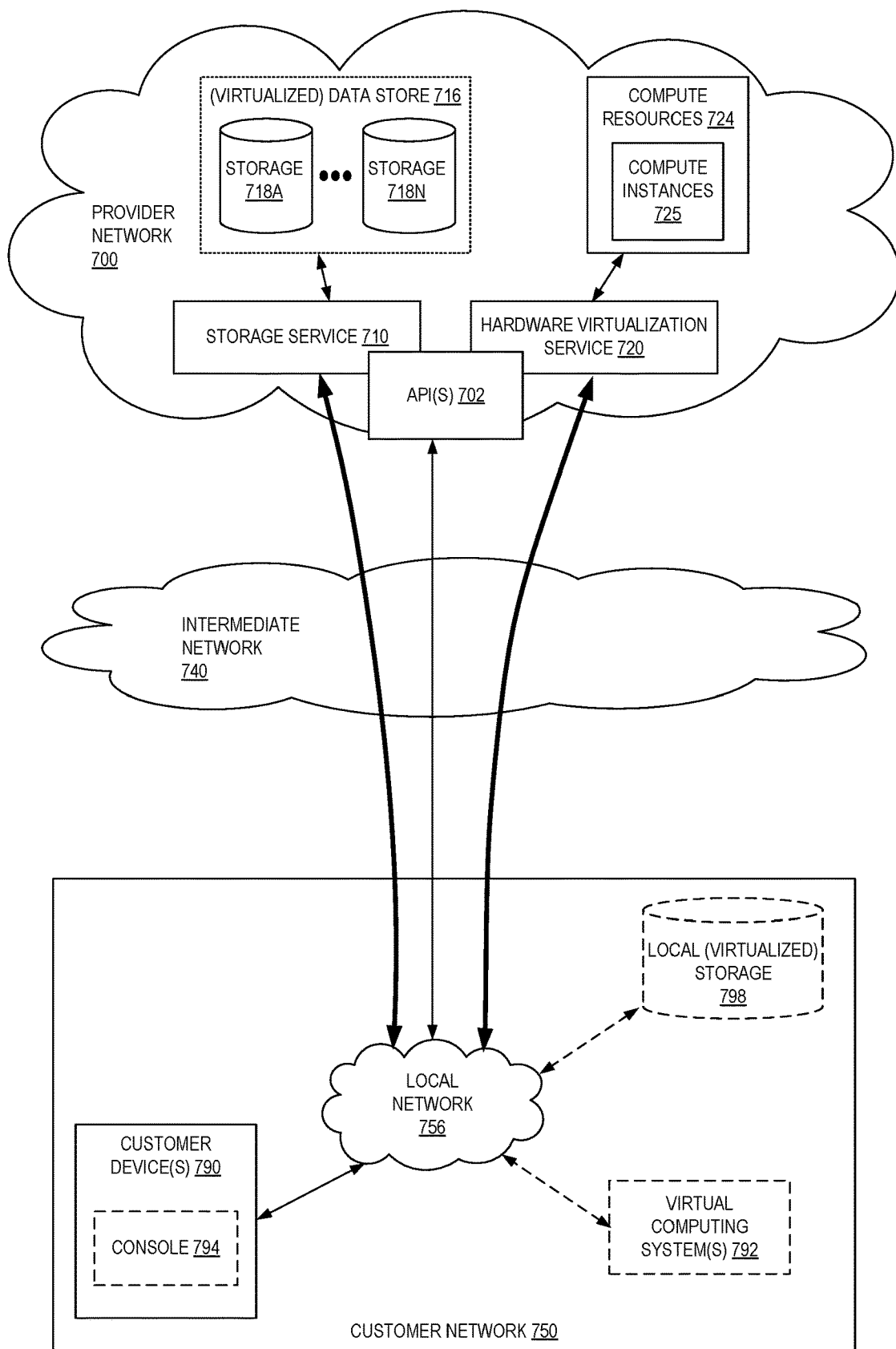
FIG. 7 is a block diagram of an example provider network that provides a storage service and a hardware virtualization service to customers according to some examples.

FIG. 7 is a block diagram of an example provider network environment that provides a storage service and a hardware virtualization service to customers, according to some examples. A hardware virtualization service 720 provides multiple compute resources 724 (e.g., compute instances 725, such as VMs) to customers. The compute resources 724 can, for example, be provided as a service to customers of a provider network 700 (e.g., to a customer that implements a customer network 750). Each computation resource 724 can be provided with one or more local IP addresses. The provider network 700 can be configured to route packets from the local IP addresses of the compute resources 724 to public Internet destinations, and from public Internet sources to the local IP addresses of the compute resources 724.

The provider network 700 can provide the customer network 750, for example coupled to an intermediate network 740 via a local network 756, the ability to implement virtual computing systems 792 via the hardware virtualization service 720 coupled to the intermediate network 740 and to the provider network 700. In some examples, the hardware virtualization service 720 can provide one or more APIs 702, for example a web services interface, via which the customer network 750 can access functionality provided by the hardware virtualization service 720, for example via a console 794 (e.g., a web-based application, standalone application, mobile application, etc.) of a customer device 790. In some examples, at the provider network 700, each virtual computing system 792 at the customer network 750 can correspond to a computation resource 724 that is leased, rented, or otherwise provided to the customer network 750.

From an instance of the virtual computing system(s) 792 and/or another customer device 790 (e.g., via console 794), the customer can access the functionality of a storage service 710, for example via the one or more APIs 702, to access data from and store data to storage resources 718A-718N of a virtual data store 716 (e.g., a folder or "bucket," a virtualized volume, a database, etc.) provided by the provider network 700. In some examples, a virtualized data store gateway (not shown) can be provided at the customer network 750 that can locally cache at least some data, for example frequently accessed or critical data, and that can communicate with the storage service 710 via one or more communications channels to upload new or modified data from a local cache so that the primary store of data (the virtualized data store 716) is maintained. In some examples, a user, via the virtual computing system 792 and/or another customer device 790, can mount and access virtual data store 716 volumes via the storage service 710 acting as a storage virtualization service, and these volumes can appear to the user as local (virtualized) storage 798.

While not shown in FIG. 7, the virtualization service(s) can also be accessed from resource instances within the provider network 700 via the API(s) 702. For example, a customer, appliance service provider, or other entity can access a virtualization service from within a respective virtual network on the provider network 700 via the API(s) 702 to request allocation of one or more resource instances within the virtual network or within another virtual network.

Figure 8:
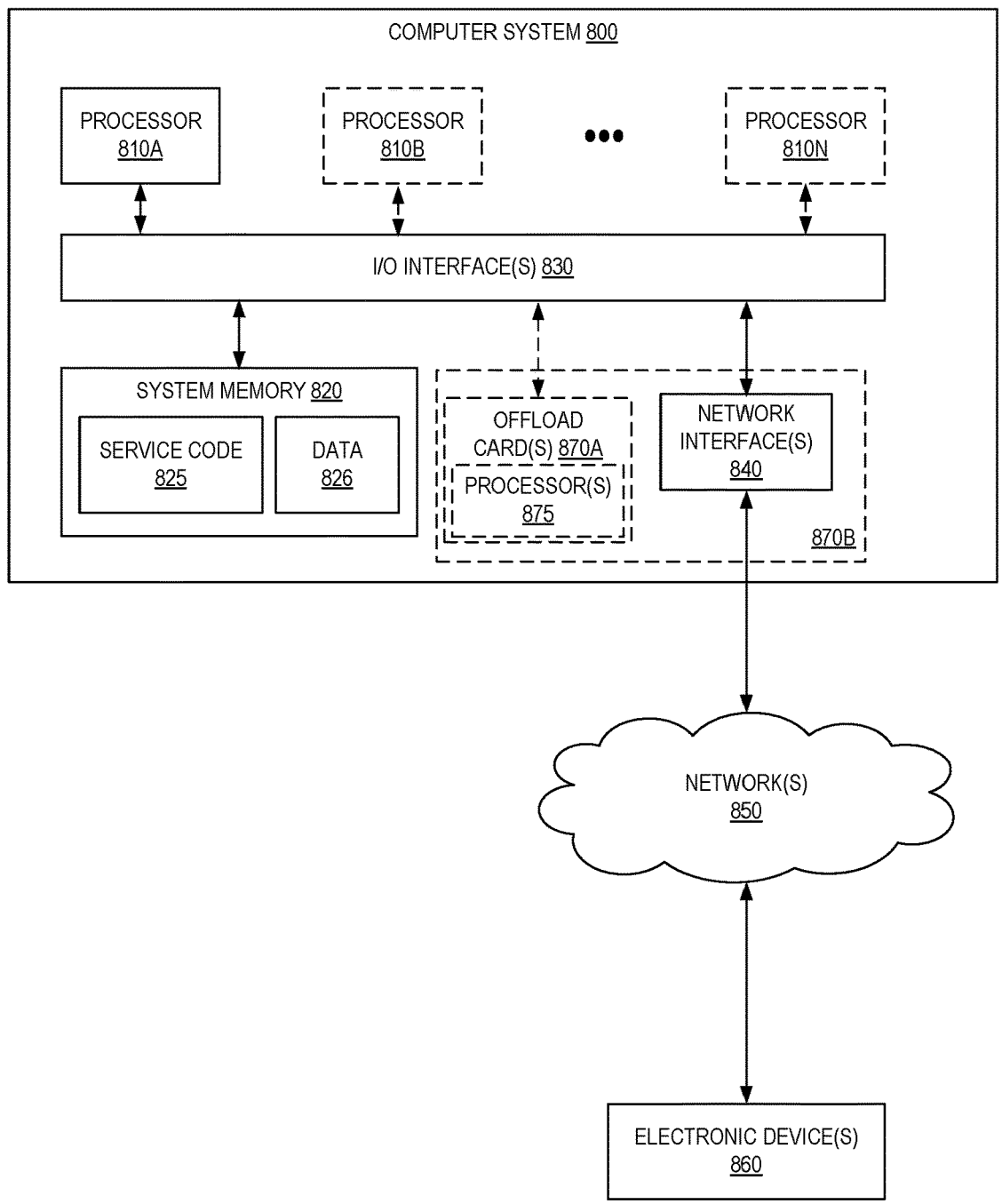
FIG. 8 is a block diagram illustrating an example computer system that can be used in some examples.

In some examples, a system that implements a portion or all of the techniques described herein can include a general-purpose computer system, such as the computer system 800 illustrated in FIG. 8, that includes, or is configured to access, one or more computer-accessible media. In the illustrated example, the computer system 800 includes one or more processors 810 coupled to a system memory 820 via an input/output (I/O) interface 830. The computer system 800 further includes a network interface 840 coupled to the I/O interface 830. While FIG. 8 shows the computer system 800 as a single computing device, in various examples the computer system 800 can include one computing device or any number of computing devices configured to work together as a single computer system 800.

In various examples, the computer system 800 can be a uniprocessor system including one processor 810, or a multiprocessor system including several processors 810 (e.g., two, four, eight, or another suitable number). The processor(s) 810 can be any suitable processor(s) capable of executing instructions. For example, in various examples, the processor(s) 810 can be general-purpose or embedded processors implementing any of a variety of instruction set architectures (ISAs), such as the x86, ARM, PowerPC, SPARC, or MIPS ISAs, or any other suitable ISA. In multiprocessor systems, each of the processors 810 can commonly, but not necessarily, implement the same ISA.

The system memory 820 can store instructions and data accessible by the processor(s) 810. In various examples, the system memory 820 can be implemented using any suitable memory technology, such as random-access memory (RAM), static RAM (SRAM), synchronous dynamic RAM (SDRAM), nonvolatile/Flash-type memory, or any other type of memory. In the illustrated example, program instructions and data implementing one or more desired functions, such as those methods, techniques, and data described above, are shown stored within the system memory 820 as service code 825 (e.g., executable to implement, in whole or in part, the assessment services 106) and data 826.

In some examples, the I/O interface 830 can be configured to coordinate I/O traffic between the processor 810, the system memory 820, and any peripheral devices in the device, including the network interface 840 and/or other peripheral interfaces (not shown). In some examples, the I/O interface 830 can perform any necessary protocol, timing, or other data transformations to convert data signals from one component (e.g., the system memory 820) into a format suitable for use by another component (e.g., the processor 810). In some examples, the I/O interface 830 can include support for devices attached through various types of peripheral buses, such as a variant of the Peripheral Component Interconnect (PCI) bus standard or the Universal Serial Bus (USB) standard, for example. In some examples, the function of the I/O interface 830 can be split into two or more separate components, such as a north bridge and a south bridge, for example. Also, in some examples, some or all of the functionality of the I/O interface 830, such as an interface to the system memory 820, can be incorporated directly into the processor 810.

The network interface 840 can be configured to allow data to be exchanged between the computer system 800 and other devices 860 attached to a network or networks 850, such as other computer systems or devices as illustrated in FIG. 1, for example. In various examples, the network interface 840 can support communication via any suitable wired or wireless general data networks, such as types of Ethernet network, for example. Additionally, the network interface 840 can support communication via telecommunications/telephony networks, such as analog voice networks or digital fiber communications networks, via storage area networks (SANs), such as Fibre Channel SANs, and/or via any other suitable type of network and/or protocol.

In some examples, the computer system 800 includes one or more offload cards 870A or 870B (including one or more processors 875, and possibly including the one or more network interfaces 840) that are connected using the I/O interface 830 (e.g., a bus implementing a version of the Peripheral Component Interconnect-Express (PCI-E) standard, or another interconnect such as a QuickPath interconnect (QPI) or UltraPath interconnect (UPI)). For example, in some examples the computer system 800 can act as a host electronic device (e.g., operating as part of a hardware virtualization service) that hosts compute resources such as compute instances, and the one or more offload cards 870A or 870B execute a virtualization manager that can manage compute instances that execute on the host electronic device. As an example, in some examples the offload card(s) 870A or 870B can perform compute instance management operations, such as pausing and/or un-pausing compute instances, launching and/or terminating compute instances, performing memory transfer/copying operations, etc. These management operations can, in some examples, be performed by the offload card(s) 870A or 870B in coordination with a hypervisor (e.g., upon a request from a hypervisor) that is executed by the other processors 810A-810N of the computer system 800. However, in some examples the virtualization manager implemented by the offload card(s) 870A or 870B can accommodate requests from other entities (e.g., from compute instances themselves), and can not coordinate with (or service) any separate hypervisor.

In some examples, the system memory 820 can be one example of a computer-accessible medium configured to store program instructions and data as described above. However, in other examples, program instructions and/or data can be received, sent, or stored upon different types of computer-accessible media. Generally speaking, a computer-accessible medium can include any non-transitory storage media or memory media such as magnetic or optical media, e.g., disk or DVD/CD coupled to the computer system 800 via the I/O interface 830. A non-transitory computer-accessible storage medium can also include any volatile or non-volatile media such as RAM (e.g., SDRAM, double data rate (DDR) SDRAM, SRAM, etc.), read only memory (ROM), etc., that can be included in some examples of the computer system 800 as the system memory 820 or another type of memory. Further, a computer-accessible medium can include transmission media or signals such as electrical, electromagnetic, or digital signals, conveyed via a communication medium such as a network and/or a wireless link, such as can be implemented via the network interface 840.

Various examples discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most examples use at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In examples using a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also can be capable of executing programs or scripts in response requests from user devices, such as by executing one or more Web applications that can be implemented as one or more scripts or programs written in any programming language, such as Java®, C, C# or C++, or any scripting language, such as Perl, Python, PHP, or TCL, as well as combinations thereof. The server(s) can also include database servers, including without limitation those commercially available from Oracle®, Microsoft®, Sybase®, IBM®, etc. The database servers can be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of examples, the information can reside in a storage-area network (SAN) familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system can also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate examples can have numerous variations from that described above. For example, customized hardware might also be used and/or particular elements might be implemented in hardware, software (including portable software, such as applets), or both. Further, connection to other computing devices such as network input/output devices can be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various examples.

In the preceding description, various examples are described. For purposes of explanation, specific configurations and details are set forth in order to provide a thorough understanding of the examples. However, it will also be apparent to one skilled in the art that the examples can be practiced without the specific details. Furthermore, well-known features can be omitted or simplified in order not to obscure the example being described.

Bracketed text and blocks with dashed borders (e.g., large dashes, small dashes, dot-dash, and dots) are used herein to illustrate optional operations that add additional features to some examples. However, such notation should not be taken to mean that these are the only options or optional operations, and/or that blocks with solid borders are not optional in certain examples.

Reference numerals with suffix letters (e.g., 718A-718N) can be used to indicate that there can be one or multiple instances of the referenced entity in various examples, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters might or might not have the same number of instances in various examples.

References to "an example," "one example," "one embodiment," "an embodiment," "an example embodiment," etc., indicate that the example or embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various examples described above, unless specifically noted otherwise, disjunctive language such as the phrase "at least one of A, B, or C" is intended to be understood to mean either A, B, or C, or any combination thereof (e.g., A, B, and/or C). Similarly, language such as "at least one or more of A, B, and C" (or "one or more of A, B, and C") is intended to be understood to mean A, B, or C, or any combination thereof (e.g., A, B, and/or C). As such, disjunctive language is not intended to, nor should it be understood to, imply that a given example requires at least one of A, at least one of B, and at least one of C to each be present.

Unless otherwise explicitly stated, articles such as "a" or "an" should generally be interpreted to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C.

The specification and drawings are, accordingly, to be regarded in an illustrative rather than a restrictive sense. It will, however, be evident that various modifications and changes can be made thereunto without departing from the broader spirit and scope of the disclosure as set forth in the claims.

What is claimed is:

1. A computer-implemented method comprising:
   obtaining application artifacts associated with a software application, wherein the application artifacts include source code files, bytecode files, or intermediate language files;
   receiving, by a software modernization service of a cloud provider network, a request to determine whether the software application is a monolithic software application, wherein the monolithic software application includes multiple types of functionality;
   identifying, based on the application artifacts, a plurality of features describing characteristics of the software application;
   using the plurality of features as input to a machine learning (ML) model to obtain a result predicting whether the software application is a monolithic software application; and
   causing display of a report including the result.

2. The computer-implemented method of claim 1, further comprising:
   obtaining, from a version control system, data reflecting changes to source code associated with the software application, wherein the data includes identifiers of users associated with the changes to the source code;
   querying a data source indicating an organizational structure associated with the users to identify a plurality of organizational units into which the users are grouped; and
   wherein a feature of the plurality of features is derived from the identification of the plurality of organizational units.

3. The computer-implemented method of claim 1, further comprising:
   obtaining an inventory of software applications associated with a user's computing environment, wherein the software applications include the software application;
   obtaining a plurality of respective feature sets corresponding to the software applications;
   using each of the plurality of respective feature sets as input to the ML model to obtain a plurality of results predicting whether each of the software applications is a monolithic software application; and
   causing display of a report including the plurality of results.

4. A computer-implemented method comprising:
   identifying, by a software modernization service of a cloud provider network, a plurality of features describing characteristics of a software application;
   using the plurality of features as input to a machine learning (ML) model to obtain a result predicting whether the software application is a monolithic software application; and
   providing access to the result indicating whether the software application is a monolithic software application.

5. The computer-implemented method of claim 4, further comprising:
   obtaining, from a version control system, data reflecting changes to source code associated with the software application, wherein the data includes identifiers of users associated with the changes to the source code;
   querying a data source indicating an organizational structure associated with the users to identify a plurality of organizational units into which the users are grouped; and
   wherein a feature of the plurality of features is derived from the identification of the plurality of organization units.

6. The computer-implemented method of claim 4, further comprising:
   obtaining an inventory of software applications associated with a user's computing environment, wherein the software applications include the software application;
   obtaining a plurality of respective feature sets corresponding to the software applications;
   using each of the plurality of respective feature sets as input to the ML model to obtain a plurality of results predicting whether each of the software applications is a monolithic software application; and
   causing display of a report including the plurality of results.

7. The computer-implemented method of claim 4, further comprising:
   obtaining an inventory of software applications associated with a user's computing environment, wherein the software applications include the software application;
   obtaining a plurality of respective feature sets corresponding to the software applications;
   using each of the plurality of respective feature sets as input to the ML model to obtain a plurality of results predicting whether each of the software applications is a monolithic software application, wherein each result of the plurality of results is associated with a respective confidence score; and
   causing display of a report including the plurality of results ranked by the respective confidence scores.

8. The computer-implemented method of claim 4, further comprising obtaining data from an automation server reflecting a number of updates to the software application over a period of time, and wherein at least one feature of the plurality of features is derived from the number of updates to the software application.

9. The computer-implemented method of claim 4, further comprising:
   identifying a category to which the software application belongs; and
   selecting the ML model from a plurality of ML models based on the category.

10. The computer-implemented method of claim 4, wherein the plurality of features include at least one of: a number of lines of code, a number of classes, a number of identified dependencies between application components of the software application, an amount of version control system activity, an amount of testing units for the software application, an amount of traffic served by the software application, a number of weakly-connected islands identified based on a graph-based analysis of the software application, a number of legacy package dependencies, or resource usage data, or a metric reflecting an amount of coupling or cohesion of the software application.

11. The computer-implemented method of claim 4, wherein the ML model is a multi-class classifier, and wherein the result indicates a type of monolithic application from a plurality of types of monolithic applications.

12. The computer-implemented method of claim 4, further comprising applying a weight to at least one feature of the plurality of features to obtain a weighted feature, and wherein the weighted feature is used as input to the ML model to obtain the result.

13. The computer-implemented method of claim 4, further comprising causing display of a report including the result indicating whether the software application is a monolithic software application and further including at least one of: a decomposition plan indicating a proposed decomposition of the software application, or a plan for migrating the software application to a cloud-based computing environment.

14. The computer-implemented method of claim 4, further comprising:
receiving input from a user confirming or rejecting the result predicting whether the software application is a monolithic software application; and
using the input to further train the ML model.

15. A system comprising:
a first one or more electronic devices to implement a software modernization agent in a multi-tenant provider network, the software modernization agent including instructions that upon execution cause the software modernization agent to collect application artifacts associated with a software application from a user's computing environment; and
a second one or more electronic devices to implement a software modernization service in the multi-tenant provider network, the software modernization service including instructions that upon execution cause the software modernization service to:
identify a plurality of features describing characteristics of a software application;
use the plurality of features as input to a machine learning (ML) model to obtain a result predicting whether the software application is a monolithic software application; and
provide access to the result indicating whether the software application is a monolithic software application.

16. The system of claim 15, wherein the software modernization service further includes instructions that upon execution cause the software modernization service to:
obtain, from a version control system, data reflecting changes to source code associated with the software application, wherein the data includes identifiers of users associated with the changes to the source code;
query a data source indicating an organizational structure associated with the users to identify a plurality of organizational units into which the users are grouped; and
wherein a feature of the plurality of features is derived from the identification of the plurality of organization units.

17. The system of claim 15, wherein the software modernization service further includes instructions that upon execution cause the software modernization service to:
obtain an inventory of software applications associated with a user's computing environment, wherein the software applications include the software application;
obtain a plurality of respective feature sets corresponding to the software applications;
use each of the plurality of respective feature sets as input to the ML model to obtain a plurality of results predicting whether each of the software applications is a monolithic software application; and
cause display of a report including the plurality of results.

18. The system of claim 15, wherein the software modernization service further includes instructions that upon execution cause the software modernization service to:
obtain an inventory of software applications associated with a user's computing environment, wherein the software applications include the software application;
obtain a plurality of respective feature sets corresponding to the software applications;
use each of the plurality of respective feature sets as input to the ML model to obtain a plurality of results predicting whether each of the software applications is a monolithic software application, wherein each result of the plurality of results is associated with a respective confidence score; and
cause display of a report including the plurality of results ranked by the respective confidence scores.

19. The system of claim 15, wherein the software modernization service further includes instructions that upon execution cause the software modernization service to obtain data from an automation server reflecting a number of updates to the software application over a period of time, and wherein at least one feature of the plurality of features is derived from the number of updates to the software application.

20. The system of claim 15, wherein the software modernization service further includes instructions that upon execution cause the software modernization service to:
identify a category to which the software application belongs; and
select the ML model from a plurality of ML models based on the category.

* * * * *